US009870397B2

(12) United States Patent
Chawda et al.

(10) Patent No.: US 9,870,397 B2
(45) Date of Patent: Jan. 16, 2018

(54) PROCESSING MULTI-WAY THETA JOIN QUERIES INVOLVING ARITHMETIC OPERATORS ON MAPREDUCE

(71) Applicant: International Business Machines Corporation, Armonk, NY (US)

(72) Inventors: Bhupesh Chawda, Bangalore (IN); Himanshu Gupta, Bangalore (IN); Sriram Raghavan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 657 days.

(21) Appl. No.: 14/462,730

(22) Filed: Aug. 19, 2014

(65) Prior Publication Data

US 2016/0055207 A1 Feb. 25, 2016

(51) Int. Cl.
*G06F 17/30* (2006.01)

(52) U.S. Cl.
CPC .. *G06F 17/30466* (2013.01); *G06F 17/30498* (2013.01)

(58) Field of Classification Search
CPC ............ G06F 17/30498; G06F 17/30466
USPC ................................. 707/714, 713
See application file for complete search history.

(56) References Cited

U.S. PATENT DOCUMENTS

| 7,873,629 B1* | 1/2011 | Morris | G06F 17/30442 |
| | | | 707/713 |
| 8,793,241 B2* | 7/2014 | Koch | G06F 17/30457 |
| | | | 707/713 |
| 2011/0055199 A1 | 3/2011 | Siddiqui et al. | |

OTHER PUBLICATIONS

"Efficient Multi-way Theta-Join Processing Using MapReduce", By: Zhang, Published: 2012; http://delivery.acm.org/10.1145/236000/2350238/p1184-zhang.pdf?ip=151.207.250.71&id=2350238&acc=ACTIVE%20SERVICE&key=C15944E53D0ACA63%2E4D4702B0C3E38B35%2E4D4702B0C3E38B35%2E4D4702B0C3E38B35&CFID=908215471&CFTOKEN=52575273&__acm__=148820148__3076dU: 68cfab.*

"Joining Interval DaAta in Relational Databases", By: Jost Enderle, Published: 2004 http://delivery.acm.org/10.1145/1010000/1007645/p683enderle.pdf?ip=151.207.250.71&id=1007645&acc=ACTIVE%20SERVICE&key=C15944E53D0ACA63%2E4D4702B0C3E38B35%2E4D4702B0C3E38B35%2E4D4702B0C3E38B35&CFID=908215471&CFTOKEN=52575273&__acm__=4788813151__01b275fedd530ad94b.*

"Join Operations in Temporal Databases", By: Dengfeng Gao, Published 2003 http://delivery.acm.org/10.1145/1060000/1053475/778_2003_Article_111.pdf?ip=151.207.250.71&id=1053475&acc=ACTIVE%20SERVICE&key=C15944E53D0ACA63%2E4D4702B0C3E38B35%2E4D4702B0C3E38B35%2E4D4702B0C3E38B35&CFID=908215471&CFTOKEN=52575273&__acm__=148820368__7081c110e56a05cd0f68c308.*

(Continued)

*Primary Examiner* — Chelcie Daye
(74) *Attorney, Agent, or Firm* — Ryan, Mason & Lewis, LLP

(57) ABSTRACT

Methods, systems, and computer program products for processing multi-way theta join queries involving arithmetic operators on MapReduce are provided herein. A method includes converting (i) a multi-way theta join query into a multi-way interval join query, and (ii) one or more items of data associated with the multi-way theta join query to one or more items of interval data; executing the multi-way interval join query on the one or more items of interval data via MapReduce to generate an output, wherein the output comprises a set of multiple responses to the multi-way interval join query; and processing the output to generate a solution to the multi-way theta join query, wherein said processing comprises discarding each response from the set that does not satisfy the multi-way theta join query.

20 Claims, 3 Drawing Sheets

(56) References Cited

OTHER PUBLICATIONS

Lim et al. Continuous Query Processing in Data Streams Using Duality of Data and Queries. Proceedings of the ACM SIGMOD International Conference on Management of Data, pp. 313-324, 2006.

Mamoulis, N. Multiway Spatial Jobs. ACM Transactions on Database Systems, vol. 26, No. 4, 424-475, Dec. 2001.

Afrati et al. Optimizing Joins in a Map-Reduce Environment, Proceedings EDBT'10 Proceedings of the 13th International Conference on Extending Database Technology, pp. 99-110, 2010.

Okcan et al. Processing Theta-Joins Using Mapreduce, SIGMOD'11, pp. 949-960, Jun. 2011.

Zhang et al. Efficient Multi-Way Theta-Join Processing Using MapReduce, Proceedings of the VLDB Endowment, vol. 5, No. 11, pp. 1184-1195, 2012.

Gupta et al. Processing Multi-Way Spatial Joins on Map-Reduce, EDBT/ICDT'13, pp. 1-12, Mar. 2013.

Chawda et al. Processing Interval Joins on Map-Reduce, Proc. 17th International Conference on Extending Database Technology (EDBT), pp. 463-474, Mar. 2014.

* cited by examiner

PROCESSING MULTI-WAY THETA JOIN QUERIES INVOLVING ARITHMETIC OPERATORS ON MAPREDUCE

FIELD OF THE INVENTION

Embodiments of the invention generally relate to information technology, and, more particularly, to MapReduce technology.

BACKGROUND

MapReduce is a programming model used in parallelizing large-scale data processing, which requires the writing of map and reduce functions. By way of example, Hadoop® is an open-source implementation of a MapReduce framework that manages communication across various nodes. Further, the Hadoop® Distributed File System (HDFS) is a storage system used by Hadoop® applications, wherein disk space is shared across all machines on a Hadoop® cluster and a file can be distributed across multiple machines.

Executing a MapReduce program incurs costs, however. Such costs commonly include, for example, disk input/output (I/O) costs, communication costs, and processing costs. For instance, disk I/O costs can include reading and/or parsing large amounts of data, and writing such data to an HDFS. Communication costs can include, for example, the communication of key-value pairs among cluster nodes, and the cost of shuffle and/or sort operations. Additionally, processing costs can include computations carried out to generate key-value pairs by map tasks, as well as computations carried out to generate outputs by reduce tasks.

A particular area that presents challenges includes processing multi-way theta join queries involving arithmetic operators on MapReduce. Join queries are an important class of queries that arise in various analytics scenarios. Join predicates may be equality predicates or inequality predicates, wherein an equality predicate involves checking two attributes for equality, while an inequality predicate (also referred to as a theta join predicate) is of the form wherein the difference between two attribute values is less than a given threshold. A two-way join query involves only two relations, while a multi-way join query involves multiple relations (and hence multiple theta join predicates). Existing query processing approaches include processing two-way inequality join queries, processing two-way and multi-way equality joins, and also processing multi-way inequality join queries using a sequence of multiple chain joins.

Also, existing query processing approaches include processing interval joins, which involves correlating intervals belonging to two or more relations. An interval has a starting point and an ending point. For example, consider the observation that it rained between 7:00 PM and 8:00 PM. Here, [between 7:00 PM and 8:00 PM] constitutes an interval. An interval predicate may check whether two intervals overlap, or whether one interval is contained within another interval, or whether one interval ends before a second interval starts, etc. Also, interval join queries can be processed much more easily vis-à-vis theta join queries on real-valued data.

However, efficient techniques for handling such multi-way theta join queries on real-valued are not encompassed by the existing approaches. Existing query processing approaches include solving multi-way theta join queries as a cascade of intermediate joins, which is computationally expensive. Consequently, a need exists for techniques for processing multi-way theta joins without requiring a cascade of intermediate joins.

SUMMARY

In one aspect of the present invention, techniques for processing multi-way theta join queries involving arithmetic operators on MapReduce are provided. An exemplary computer-implemented method can include steps of converting (i) a multi-way theta join query into a multi-way interval join query, and (ii) one or more items of data associated with the multi-way theta join query to one or more items of interval data; executing the multi-way interval join query on the one or more items of interval data via MapReduce to generate an output, wherein the output comprises a set of multiple responses to the multi-way interval join query; and processing the output to generate a solution to the multi-way theta join query, wherein said processing comprises discarding each response from the set that does not satisfy the multi-way theta join query.

In another aspect of the invention, an exemplary computer-implemented method can include steps of converting a multi-way theta join query into a multi-way interval join query, wherein the multi-way theta join query comprises one or more join conditions involving one or more arithmetic operators on one or more items of real-valued data; optimizing the multi-way interval join query to reduce the number of conditions in the multi-way interval join query; executing the optimized multi-way interval join query via MapReduce to generate an output; and processing the output to generate a solution in response to the multi-way theta join query.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
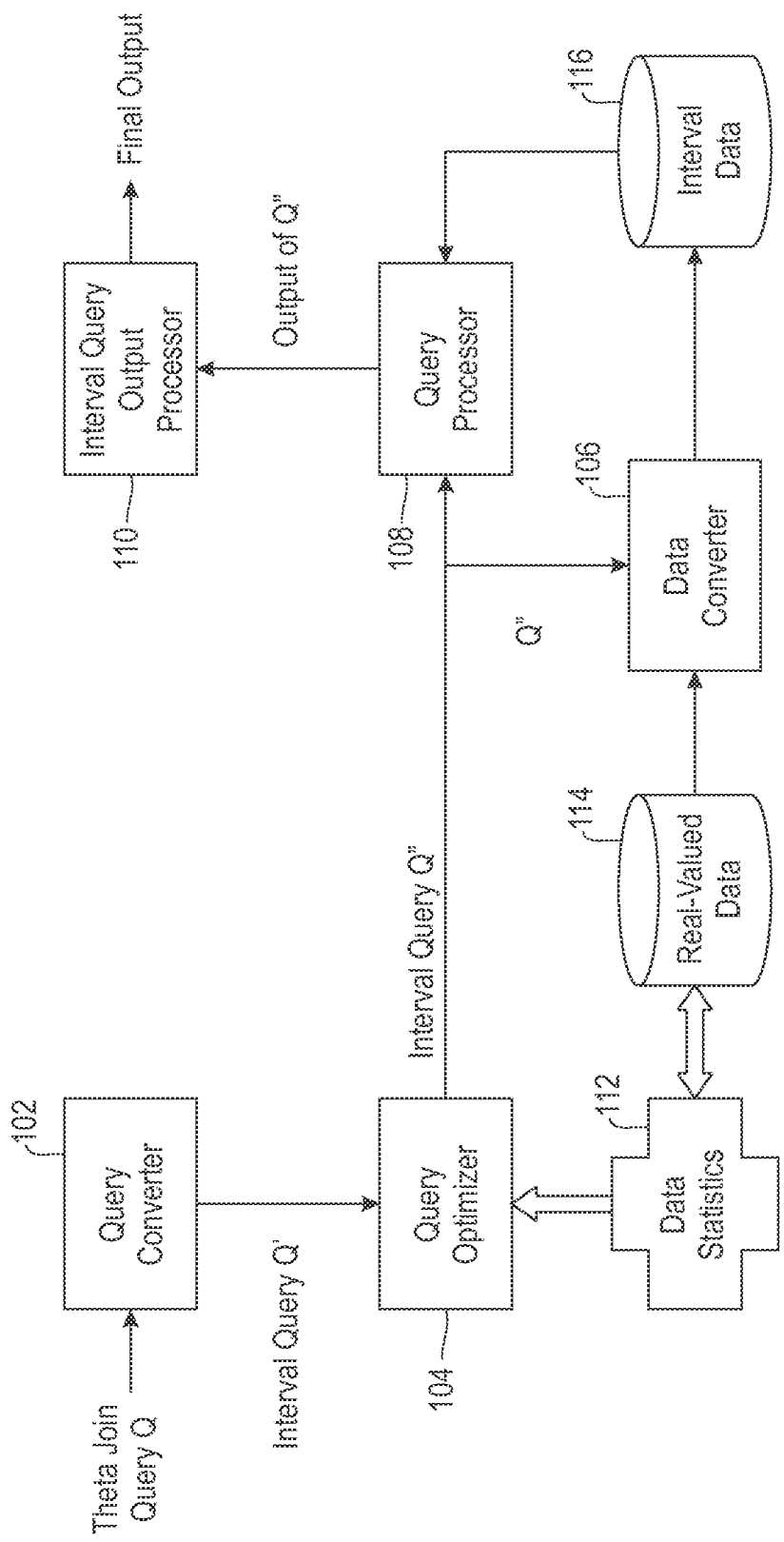
FIG. 1 is a block diagram illustrating an example embodiment, according to an aspect of the invention.

As described herein, an aspect of the present invention includes processing multi-way theta join queries involving arithmetic operators on MapReduce, wherein the multi-way theta join (also referred to herein as an inequality join) is processed in one iteration rather than as a sequence of multiple smaller join queries. Additionally, an aspect of the invention includes leveraging the concept that a multi-way theta join query on real-value data involving arithmetic operators can be transformed to a multi-way interval join query, and the real-valued data can be transformed to interval data.

Additionally, an aspect of the invention includes transforming (or generalizing) a multi-way theta join query on real-valued data to a multi-way interval join query, wherein real-valued data can also be suitably transformed into interval data. The multi-way theta join query on real-valued data, hence, can be solved by processing transformed multi-way interval join query on transformed interval data. That said, the mapping of a multi-way theta join query on real-valued data to multi-way interval join query is not one-to-one, and the output of a multi-way interval join query is a super-set of the output of a multi-way theta join query on real-valued data. As such, and as further described herein, an additional aspect of the invention includes processing (or post-processing) the output of a multi-way interval join query, wherein those tuples which do not satisfy the theta join predicates are discarded.

Accordingly, at least one embodiment of the invention includes converting a given multi-way theta or inequality join query into a multi-way interval join query, processing this converted query using interval joins processing approaches, and post-processing the output of interval join query. Also, in one or more embodiments of the invention, a multi-way inequality join query on real-valued data can be converted into multiple interval join queries, and accordingly, such an embodiment includes a component for selecting one interval join query which is likely to take a minimal time to execute from the multiple interval join queries.

By way of example, theta join queries with arithmetic operators can include inequality joins, wherein each condition is of the form:

T1: $\theta_1 \le A - c.B \le \theta_2$, or

T2: $A - c.B \le \theta_2$, or

T3: $A - c.B \ge \theta_1$, wherein A and B are real-valued attributes, and (lower-case) c is a real-valued constant.

As used herein, a "real-valued attribute" refers to an attribute which can take a real value (that is, an integer or float). For example, real values can include 1, 2, 3.5, 0.00056, etc. Examples of values which are not real include complex numbers, polygons, sets, etc. Additionally, all join conditions involving binary arithmetic operations (addition, subtraction, multiplication, and division) on real-valued data can be reduced to the three above-noted equations.

Also, as described herein, interval join queries can be categorized and/or identified via classes. Classes of interval join queries can include, for example, co-location interval join queries, sequence interval join queries, hybrid interval join queries, and general interval join queries. Co-location interval join queries include predicates wherein the two intervals are required to share at least one point; for example, a join of A, B, and C, wherein A.I overlaps B.I and B.I contains C.I. As used herein, A, B, and (upper-case) C refer to relations, while I refers to an interval attribute. Additionally, operators used in this class can include, for instance, overlaps, contains, starts, ends, and intersects.

Sequence interval join queries include predicates wherein the two intervals do not share any point; for example, a join of A, B, and C, wherein A.I is before B.I, and B.I is after C.I. Operators used in this class can include, for instance, before and after. Additionally, hybrid interval join queries can include both co-location and sequence predicates; for example, a join of A, B, and C, wherein A.I overlaps B.I and B.I is before C.I.

Further, general interval join queries can include, by way of example, a join of A, B, and C, wherein A.attr <B.attr, and B.I overlaps C.I, wherein "attr" represents a single attribute. Further, as used herein, an "attribute" refers to a column in a table and/or database. Such general interval join queries can include interval as well as non-interval attributes.

Accordingly, at least one embodiment of the invention includes solving a multi-way theta join query involving binary arithmetic operators by converting the multi-way theta join query into an interval query, executing the interval join query, and processing the interval join query output. In such an embodiment, one or more items of data (for example, real-valued data) is converted into interval data. Additionally, such an embodiment can include reducing conditions involving arithmetic operators to standard forms (T1, T2 and T3, as noted above).

By way merely of illustration, consider the following example query of S.A−R.A<10, T.A−S.A<5 and T.A−R.A<4 (wherein R, S and T are three relations and A is an attribute). As evidenced below, one or more embodiments of the invention can include the consideration of multiple options for performing a conversion of a query to an interval query and conversion of real-valued data to interval data. For instance, using this example, an interval query can include R intersects S, S intersects T, and R intersects T. In such an example, interval data can include each point in R and S being converted to length 10 and 5 with the data in T remaining identical; or each point in R being of length 4 and each point in S being of length 5; or each point in R being of length 4; and/or each point in S being of length 4. Additionally, an interval query can also include R contains S and R contains T, R intervals of length 10 and S intervals of length 5. Further, another interval query can include R contains S, R contains T, and R intervals of length 9.

FIG. 1 is a block diagram illustrating an example embodiment, according to an aspect of the invention. By way of illustration, FIG. 1 depicts a system architecture that includes a query converter component 102, a query optimizer component 104, a data converter component 106, a query processor component 108 and an interval query output processor component 110. An example embodiment of the invention can be carried out via the system architecture depicted in FIG. 1, for example, as follows.

A theta join query Q is provided to and/or captured by the query converter component 102, and the query converter component 102 converts the theta join query Q into an interval query Q'. The query converter component 102 transmits the interval query Q' to the query optimizer component 104, which also receives input from a source of data statistics 112. Data statistics 112 can include, for example, information pertaining to the distribution of the data. The query optimizer component 104 optimizes the interval query Q' and transmits an optimized interval query Q" to the data converter component 106 as well as to the query processor component 108. In optimizing the interval query Q', the query optimizer component 104 can carry out a variety of actions. Such actions can include, for example, removing a predicate by identifying that the predicate is redundant, combining two or more predicates, etc.

The data converter component 106 receives input from database 114, which contains real-valued data. Also, database 114 receives input from the data statistics component 112. Accordingly, as further described below, a real-valued theta join query is converted into an interval join query, and real-valued data are converted into interval data on which the interval join query is executed. However, the conversion from real-valued data to interval data need not be physical, and intervals need not necessarily be written onto a disk.

As such, the data converter component 106 converts real-valued data to interval data, processes the optimized interval query Q″ and provides the converted data to the interval data database 116, which ultimately provides input to the query processor component 108.

As depicted in FIG. 1, the query processor component 108 processes the optimized interval query Q″ and generates an output which is provided to the interval query output processor component 110. More specifically, the query processor component 108 executes one or more interval join algorithms, and the resulting output generated by executing interval join query on the interval data is provided to component 110.

The interval query output processor component 110 processes the noted output and generates a final output. By way of example, the output of the interval join query on the interval data can include a super-set of output of real-valued multi-way theta join query on real-valued data. The output processor component 110 filters this output and converts the interval output back to real-valued data.

As noted, in at least one example embodiment of the invention, theta join queries with arithmetic operators can include inequality joins, with each condition of the form:

Type 1 (T1): $\theta_1 \leq A - c.B \leq \theta_2$, or

T2: $A - c.B \leq \theta_2$, or

T3: $A - c.B \geq \theta_1$, wherein A and B are real-valued attributes, and c is a real-valued constant.

Accordingly, a data and query conversion can be carried out as follows. For example, T1 can be reduced to an intersect predicate, such as: $\theta_1 \leq A - c.B \leq \theta_2$, transformed to A intersects B, A is a point, and B is an interval. Additionally, each point in B can be converted to an interval of length $\theta_2 - \theta_1$ starting at point c.B. Also, if multiple such conditions exist involving relation B with the starting point of the B interval being $s_x$ and the end point being $e_x$, in a condition with no x, an example embodiment of the invention can include creating an interval starting at point $\min(s_x)$ and ending at point $\max(e_x)$. As used herein, notations s and e refer to a start-point and an end-point, respectively. As such, the above description details a technique for converting real-valued data to interval data utilized by one or more embodiments of the invention.

Further, T2 and T3 can be reduced to before and after predicates, such as:

$A - c.B \leq \theta_2$ changed to A before B, $A - c.B \geq \theta_1$ changed to A after B, and A and B remaining real-valued points (that is, intervals of length 0).

As also detailed herein, one or more optimizations can be carried out on top of a condition set. For example, consider the join conditions A−2B<10, and B−3C<10. The equations can be re-written as A/2−B<5, B−3C<10. In such an embodiment of the invention, instead of A and C, new attributes, A/2 and 3C, are introduced. The resulting join queries can be solved using interval join algorithms more efficiently, as would be known and appreciated by one skilled in the art.

Figure 2:
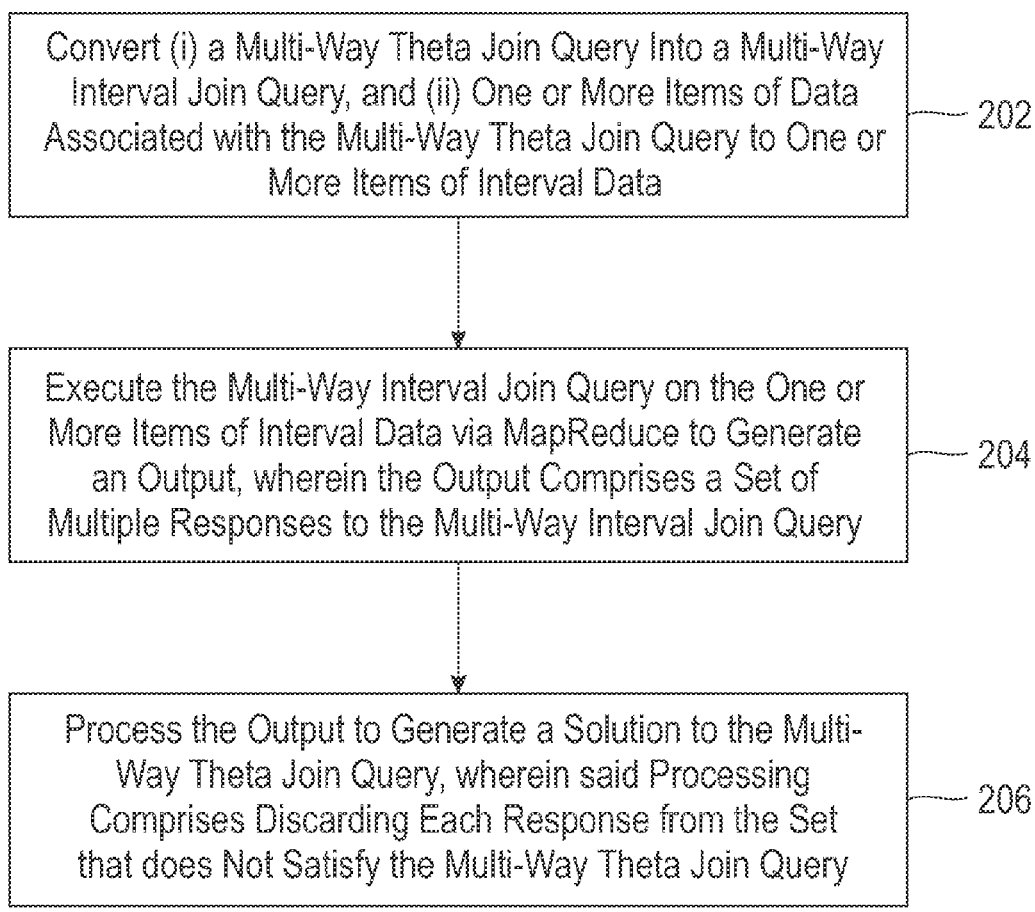
FIG. 2 is a flow diagram illustrating techniques according to an embodiment of the invention.

FIG. 2 is a flow diagram illustrating techniques according to an embodiment of the invention. Step 202 includes converting (i) a multi-way theta join query into a multi-way interval join query, and (ii) one or more items of data associated with the multi-way theta join query to one or more items of interval data. Also, one or more embodiments of the invention can include storing the one or more items of interval data.

Converting can include converting the multi-way theta join query into multiple multi-way interval join queries. Such an embodiment can further include selecting one multi-way interval join query from the multiple multi-way interval join queries.

Step 204 includes executing the multi-way interval join query on the one or more items of interval data via MapReduce to generate an output, wherein the output comprises a set of multiple responses to the multi-way interval join query. Step 206 includes processing the output to generate a solution to the multi-way theta join query, wherein said processing comprises discarding each response from the set that does not satisfy the multi-way theta join query. As detailed herein, processing includes generating the solution without a series of intermediate joins.

The techniques depicted in FIG. 2 include optimizing the multi-way interval join query. Optimizing can include reducing the number of conditions in the multi-way interval join query involving one or more arithmetic operators. Additionally, optimizing can include incorporating one or more items of real-valued data.

Also, the techniques depicted in FIG. 2 can further include categorizing the multi-way interval join query into one of multiple classes, wherein the multiple classes include (i) co-location interval join queries, (ii) sequence interval join queries, (iii) hybrid interval join queries, and (iv) general interval join queries.

As also detailed herein, at least one embodiment of the invention includes the steps of converting a multi-way theta join query into a multi-way interval join query, wherein the multi-way theta join query comprises one or more join conditions involving one or more arithmetic operators on one or more items of real-valued data, and optimizing the multi-way interval join query to reduce the number of conditions in the multi-way interval join query that include the one or more arithmetic operators. Such an embodiment further includes executing the optimized multi-way interval join query via MapReduce to generate an output, and processing the output to generate a solution in response to the optimized multi-way theta join query.

Similar to the techniques depicted in FIG. 2, such an embodiment can include converting one or more items of data associated with the multi-way theta join query to one or more items of interval data, as well as generating one or more items of intermediate data. Additionally, such an embodiment can include converting the multi-way theta join query into multiple multi-way interval join queries, and selecting one multi-way interval join query from the multiple multi-way interval join queries.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 3:
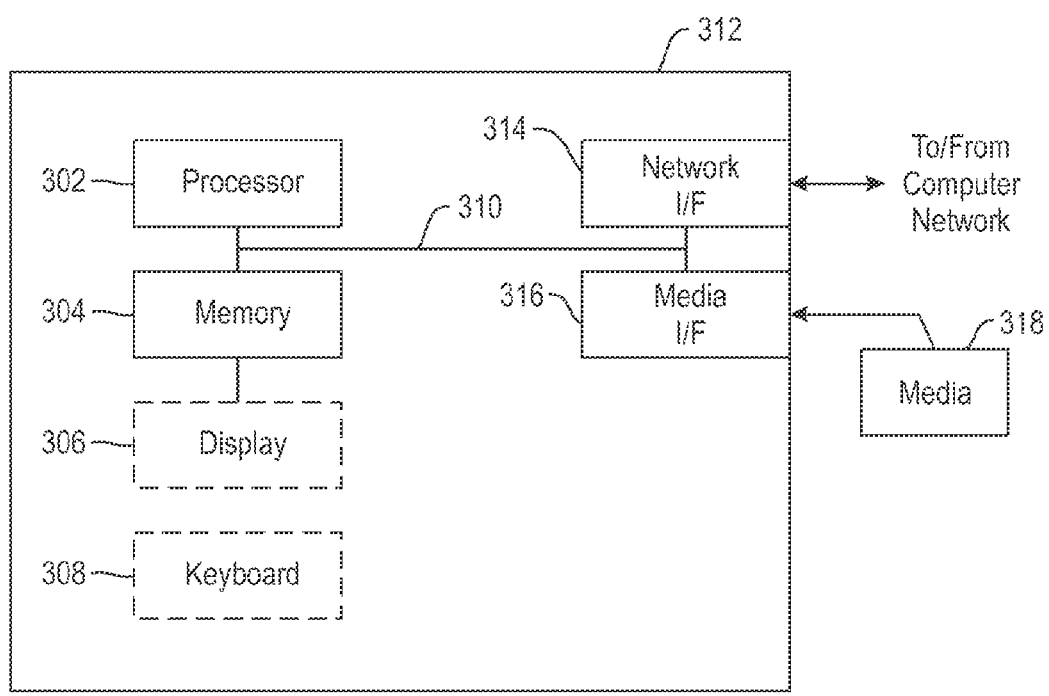
FIG. 3 is a system diagram of an exemplary computer system on which at least one embodiment of the invention can be implemented.

Additionally, an aspect of the present invention can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, processing multi-way theta join queries in one iteration rather than as a sequence of multiple smaller join queries.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
converting (i) a multi-way theta join query on MapReduce into a multi-way interval join query on MapReduce, and (ii) one or more items of data associated with the multi-way theta join query to one or more items of interval data;
executing the multi-way interval join query on the one or more items of interval data via MapReduce to generate an output, wherein the output comprises a set of multiple responses to the multi-way interval join query; and
processing the output to generate a solution to the multi-way theta join query, wherein said processing comprises discarding each response from the set that does not satisfy the multi-way theta join query;
wherein said converting, said executing, and said processing are carried out by at least one computing device.

2. The method of claim 1, wherein said processing comprises generating the solution without a series of intermediate joins.

3. The method of claim 1, comprising:
storing said one or more items of interval data.

4. The method of claim 1, comprising:
optimizing the multi-way interval join query.

5. The method of claim 4, wherein said optimizing comprises reducing the number of conditions in the multi-way interval join query involving one or more arithmetic operators.

6. The method of claim 1, wherein said converting comprises converting the multi-way theta join query into multiple multi-way interval join queries.

7. The method of claim 6, comprising:
selecting one multi-way interval join query from the multiple multi-way interval join queries.

8. The method of claim 1, comprising:
categorizing the multi-way interval join query into one of multiple classes.

9. The method of claim 8, wherein the multiple classes comprise (i) co-location interval join queries, (ii) sequence interval join queries, (iii) hybrid interval join queries, and (iv) general interval join queries.

10. A computer program product, the computer program product comprising a computer readable storage medium having program instructions embodied therewith, the program instructions executable by a computing device to cause the computing device to:
convert (i) a multi-way theta join query on MapReduce into a multi-way interval join query on MapReduce, and (ii) one or more items of data associated with the multi-way theta join query to one or more items of interval data;
execute the multi-way interval join query on the one or more items of interval data via MapReduce to generate an output, wherein the output comprises a set of multiple responses to the multi-way interval join query; and
process the output to generate a solution to the multi-way theta join query, wherein said processing comprises discarding each response from the set that does not satisfy the multi-way theta join query.

11. The computer program product of claim 10, wherein said processing comprises generating the solution without a series of intermediate joins.

12. A system comprising:
a memory; and
at least one processor coupled to the memory and configured for:
converting (i) a multi-way theta join query on MapReduce into a multi-way interval join query on MapReduce, and (ii) one or more items of data associated with the multi-way theta join query to one or more items of interval data;
executing the multi-way interval join query on the one or more items of interval data via MapReduce to generate an output, wherein the output comprises a set of multiple responses to the multi-way interval join query; and
processing the output to generate a solution to the multi-way theta join query, wherein said processing comprises discarding each response from the set that does not satisfy the multi-way theta join query.

13. The system of claim 12, wherein said processing comprises generating the solution without a series of intermediate joins.

14. A method comprising:
converting a multi-way theta join query on MapReduce into a multi-way interval join query on MapReduce, wherein the multi-way theta join query comprises one or more join conditions involving one or more arithmetic operators on one or more items of real-valued data;
optimizing the multi-way interval join query to reduce the number of conditions in the multi-way interval join query that include the one or more arithmetic operators;
executing the optimized multi-way interval join query via MapReduce to generate an output; and
processing the output to generate a solution in response to the optimized multi-way theta join query;
wherein said converting, said optimizing, said executing, and said processing are carried out by at least one computing device.

15. The method of claim 14, wherein said converting further comprises converting one or more items of data associated with the multi-way theta join query to one or more items of interval data.

16. The method of claim 15, wherein said converting the one or more items of data associated with the multi-way theta join query to one or more items of interval data comprises generating one or more items of intermediate data.

17. The method of claim 14, wherein said converting comprises converting the multi-way theta join query into multiple multi-way interval join queries.

18. The method of claim 17, comprising:
selecting one multi-way interval join query from the multiple multi-way interval join queries.

19. The method of claim 14, comprising:
categorizing the multi-way interval join query into one of multiple classes.

20. The method of claim 19, wherein the multiple classes comprise (i) co-location interval join queries, (ii) sequence interval join queries, (iii) hybrid interval join queries, and (iv) general interval join queries.

* * * * *